(12) United States Patent
Crocker (10) Patent No.: US 11,849,875 B1
(45) Date of Patent: Dec. 26, 2023

(54) WATERED TREE STAND SYSTEM

(71) Applicant: Wayne R. Crocker, North Las Vegas, NV (US)

(72) Inventor: Wayne R. Crocker, North Las Vegas, NV (US)

( * ) Notice: Subject to any disclaimer, the term of this patent is extended or adjusted under 35 U.S.C. 154(b) by 130 days.

(21) Appl. No.: 17/368,565

(22) Filed: Jul. 6, 2021

Related U.S. Application Data (63) Continuation-in-part of application No. 16/204,330, filed on Nov. 29, 2018, now abandoned.

(60) Provisional application No. 62/591,903, filed on Nov. 29, 2017.

(51) Int. Cl.
   *A47G 33/12* (2006.01)
   *A01G 27/00* (2006.01)

(52) U.S. Cl.
   CPC ........... *A47G 33/12* (2013.01); *A01G 27/005* (2013.01); *A47G 2033/1293* (2013.01)

(58) Field of Classification Search
   CPC .. A01G 27/005; A01G 27/006; A01G 27/008; A01G 27/02; A01G 27/06; A01G 27/003; A47G 33/12; A47G 2033/1286; A47G 2033/1293; A47G 33/1206; A47G 33/0881
   See application file for complete search history.

(56) References Cited

U.S. PATENT DOCUMENTS

| | | | |
|---|---|---|---|
| 3,469,342 A | 9/1969 | Morris | |
| 4,930,252 A | 6/1990 | Krause et al. | |
| 5,009,028 A * | 4/1991 | Lorenzana | A47G 33/12 47/79 |
| 5,076,009 A | 12/1991 | Cibor | |
| 5,201,140 A * | 4/1993 | Voorhis | A47G 33/12 47/79 |
| 5,425,199 A * | 6/1995 | Sofy | A47G 33/12 47/40.5 |
| 5,791,082 A | 8/1998 | Finello | |
| 5,966,864 A * | 10/1999 | Flink | A01G 27/005 47/40.5 |
| 6,070,848 A * | 6/2000 | Ogren | A47G 33/12 248/188.4 |
| 6,327,816 B1 * | 12/2001 | Walterscheid | A01G 27/005 47/62 R |
| 6,367,195 B1 * | 4/2002 | Heyworth | A01G 27/005 47/40.5 |
| 6,497,071 B1 * | 12/2002 | Main | A47G 33/12 47/79 |
| 7,757,434 B1 | 7/2010 | Naclerio | |

(Continued)

*Primary Examiner* — Trinh T Nguyen
(74) *Attorney, Agent, or Firm* — John Rizvi; John Rizvi, P.A.—The Patent Professor®

(57) ABSTRACT

A watered tree stand system, which facilitates continual watering of a tree supported by the tree stand system, includes a base reservoir having a reservoir interior suitably configured to contain a supply of water and receive the trunk of a tree. The base reservoir is suitably configured to support a tree in an upward-standing position. A preferably see-through, water intake container is disposed in spaced-apart relationship to the base reservoir. The water intake container is suitably configured to contain a supply of refill water. An elongated water delivery conduit establishes fluid communication between the water intake container and the base reservoir.

24 Claims, 9 Drawing Sheets

(56) References Cited

U.S. PATENT DOCUMENTS

| | | | |
|---|---|---|---|
| 8,166,702 B1* | 5/2012 | Laface | A47G 33/12 47/40.5 |
| 2002/0108301 A1* | 8/2002 | Tasker | A01G 27/005 47/40.5 |
| 2005/0229482 A1 | 10/2005 | Wynn | |
| 2006/0065318 A1* | 3/2006 | Shepardson | A01G 27/005 137/885 |
| 2006/0213121 A1 | 9/2006 | Mercado, Jr. et al. | |
| 2007/0062110 A1 | 3/2007 | Lofboom | |
| 2015/0000746 A1 | 1/2015 | Peterson | |
| 2015/0047255 A1* | 2/2015 | Casdorph | A01G 27/005 47/40.5 |
| 2016/0022082 A1* | 1/2016 | Pellegrini | A47G 33/1226 29/428 |

\* cited by examiner

PRIOR ART

WATERED TREE STAND SYSTEM

CROSS-REFERENCE TO RELATED APPLICATION

This application is a Continuation-In-Part (CIP) of U.S. Non-Provisional patent application Ser. No. 16/204,330, filed on Nov. 29, 2018, which in turn claims the benefit of U.S. Provisional Patent Application Ser. No. 62/591,903, filed on Nov. 29, 2017, both of which are incorporated by reference herein in their entirety.

FIELD OF THE INVENTION

The present invention relates generally to tree stands, and more particularly, to a watered tree stand system which is easy to access and facilitates continual replenishment and watering of a tree supported by the watered tree stand system.

BACKGROUND OF THE INVENTION

Christmas trees are commonly deployed in homes during the holiday season and are frequently decorated with lights, tinsel and ornaments. Christmas trees may be artificial or real. Artificial Christmas trees are typically fabricated of plastic and include a tree stand which supports the tree in an upward-standing position on a flat supporting surface. One of the advantages of artificial Christmas trees is that the trees do not require watering and can be used numerous times.

Figure 6:
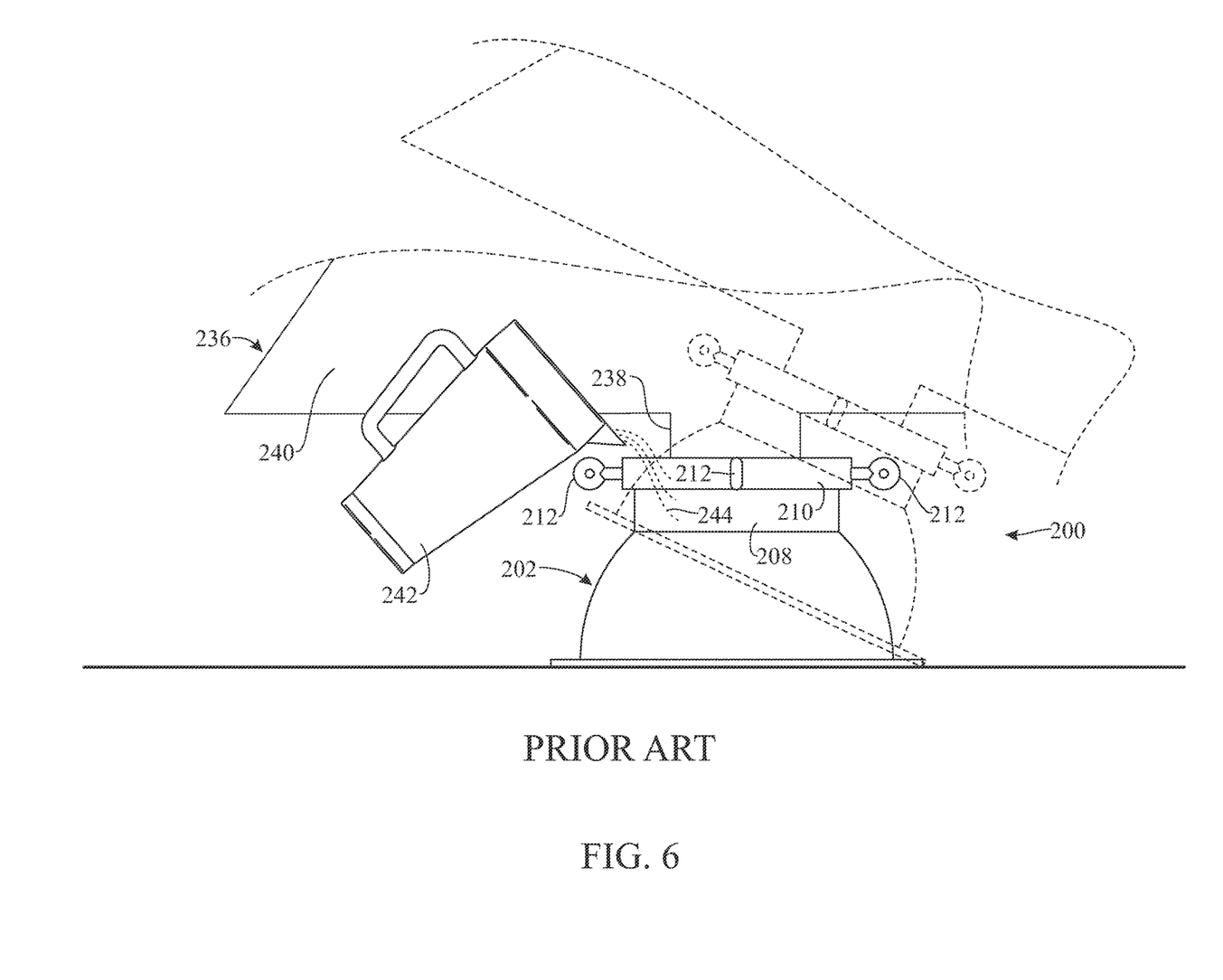
FIG. 6 presents a side view of a typical conventional water-containing tree stand, showing that the tree stand and tree may require tilting (shown in phantom lines) to facilitate placement of refill water into the tree stand.

Despite the advantages of artificial Christmas trees, many persons still prefer to deploy real Christmas trees in their homes since a real tree is generally more realistic and natural in appearance than an artificial tree and may emanate smells which accentuate the spirit of the season. A real Christmas tree is typically cut from a forest or tree farm. The tree is typically deployed in a tree stand which supports the tree and is preferably configured to contain a supply of water such that the tree can be watered and remain fresh throughout its use. For example, as illustrated in FIG. 6 of the drawings, a conventional tree stand 200 may include a reservoir 202. The reservoir 202 may include a reservoir rim 208. A tree securing collar 210 fitted with tree securing fasteners 212 may be provided on the reservoir rim 208. Accordingly, the tree trunk 238 of a real tree 236 may be secured in the reservoir 202 by securing the tree trunk 238 within the tree securing collar 210 typically using the tree securing fasteners 212, which are often designed to exert a radially-inward pressure on the outside of the tree trunk 238 from different angles, stabilizing the tree trunk 238. Water 244 may be periodically poured into the reservoir 202 from a water container 242 such as ajar, bottle or the like, to keep the tree trunk 238 and thus the tree 236 hydrated.

One of the drawbacks which is inherent in the conventional tree stand 200 is that a user typically must reach beneath the main tree portion 240 of the tree 236 in order to replenish and pour the water 244 into the reservoir 202. As illustrated in FIG. 6, in dependence of the size of the tree 236, the water container 242 and/or the reservoir 202, watering the tree 236 using the water container 242 may necessitate tilting of the tree 236 in order to properly position the reservoir 202 to effectively pour the water 244 from the water container 242 into the reservoir 202. Consequently, the tree 236 may inadvertently fall over, resulting in potential breakage of the tree 236 and scattering of needles from the tree 236 and spilling of water from the water container 242 and/or the reservoir 202 onto the floor.

Accordingly, there is an established need for a watered tree stand system which is easy to access and facilitates continual replenishment and watering of a tree supported by the watered tree stand system, while minimizing the risk of spilling water or having the tree fall over.

SUMMARY OF THE INVENTION

The present invention is directed to a watered tree stand system which is easy to access and facilitates continual replenishment and watering of a tree supported by the watered tree stand system. The watered tree stand system may include a base reservoir having a reservoir interior which contains a supply of water. The base reservoir may facilitate securement of the tree trunk of a real tree in the base reservoir. A water intake container may be disposed in spaced-apart relationship and in fluid communication with the base reservoir through an elongated water delivery conduit. The water intake container may contain a supply of refill water which may be delivered to the base reservoir through the water delivery conduit. The water intake container may be disposed at a spacing with respect to the base reservoir which places the water intake container beyond the main tree portion of the tree to facilitate unhindered ease of access by a user as the user places a supply of refill water in the water intake container. Accordingly, the user need not reach beneath the main tree portion of the tree to pour the refill water into the base reservoir and maintain a continuous supply of water to the tree. Thus, the tree stand system may facilitate continual replenishment and watering of the tree and maintain the tree in a fresh and live condition throughout its use.

Introducing an illustrative embodiment of the invention, the present invention includes a watered tree stand system comprising:

a base reservoir configured to stably rest on a flat surface and support a tree in an upright position relative to the surface, the base reservoir comprising:
   a base reservoir interior configured to contain water and receive a trunk of said tree,
   a base reservoir bottom, arranged in an elevated position relative to the surface, a space being provided between the base reservoir bottom and the surface when the base reservoir is resting on said surface,
   a base reservoir sidewall extending from the base reservoir bottom, the base reservoir sidewall and the base reservoir bottom defining the base reservoir interior, and
   an inlet formed through the base reservoir bottom and arranged facing said space;
a water intake container disposed in spaced-apart relationship with the base reservoir, the water intake container having a water intake container interior configured to contain water; and
a water delivery conduit configured to establish fluid communication between the water intake container interior and the base reservoir interior through the inlet of the base reservoir bottom.

In a second aspect, the inlet may be offset a center of the base reservoir bottom.

In another aspect, the base reservoir sidewall may extend from an outer edge of the base reservoir bottom. The inlet may be closer to the outer edge of the base reservoir bottom than to the center of the base reservoir bottom.

In another aspect, the inlet may be adjacent to the outer edge of the base bottom.

In another aspect, the base reservoir may include an outer skirt arranged around and in spaced-apart relationship with the base reservoir sidewall and concealing the base reservoir sidewall and base reservoir bottom.

In yet another aspect, a bottom side of the outer skirt may be configured to stably rest on the surface.

In another aspect, the tree stand system may further include one or more reinforcement ribs extending from the outer skirt and to the base reservoir sidewall.

In another aspect, the one or more reinforcement ribs may include a plurality of reinforcement ribs arranged radially and angularly equidistant relative to a central longitudinal axis of the base reservoir.

In another aspect, each reinforcement rib of the one or more reinforcement ribs may include a respective bottom side configured to stably rest on the surface.

In yet another aspect, the base reservoir bottom may be arranged in an elevated relationship relative to a lower portion of the base reservoir sidewall. The water delivery conduit may extend through a first opening formed in the outer skirt and through a second opening formed in the lower portion of the base reservoir sidewall.

In another aspect, the first opening may extend from a bottom side of the outer skirt. The bottom side of the outer skirt may be configured to stably rest on the surface.

In another aspect, a bottom side of the base reservoir sidewall may be configured to stably rest on the surface. The bottom sides of the outer skirt and base reservoir sidewall may be concentric.

In another aspect, the second opening may extend from a bottom side of the base reservoir sidewall. The bottom side of the base reservoir sidewall may be configured to stably rest on the surface.

In yet another aspect, the first and second openings may be arranged facing one another.

In another aspect, the base reservoir may include an elbow-shaped, water inlet connector connected to the inlet of the base reservoir bottom and extending through the lower portion of the base reservoir sidewall.

In another aspect, the tree stand system may further include one or more reinforcement ribs extending from the lower portion of the base reservoir sidewall to a central column, the central column extending downward of the base reservoir bottom and having a bottom side configured to stably rest on the surface.

In another aspect, the one or more reinforcement ribs which extend from the lower portion of the base reservoir sidewall may include a plurality of reinforcement ribs arranged in radial and angularly equidistant configuration relative to a central longitudinal axis of the base reservoir.

In yet another aspect, the base reservoir may include one or more top portions extending from the base reservoir sidewall and provided with a greater width than the base reservoir sidewall. Each top portion of the one or more top portions comprising a fastener opening for receiving a respective fastener configured to engage the trunk of the tree to support the tree in the upright position.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a watered tree stand system which is easy to access and facilitates continual replenishment and watering of a tree supported by the watered tree stand system.

Figure 1:
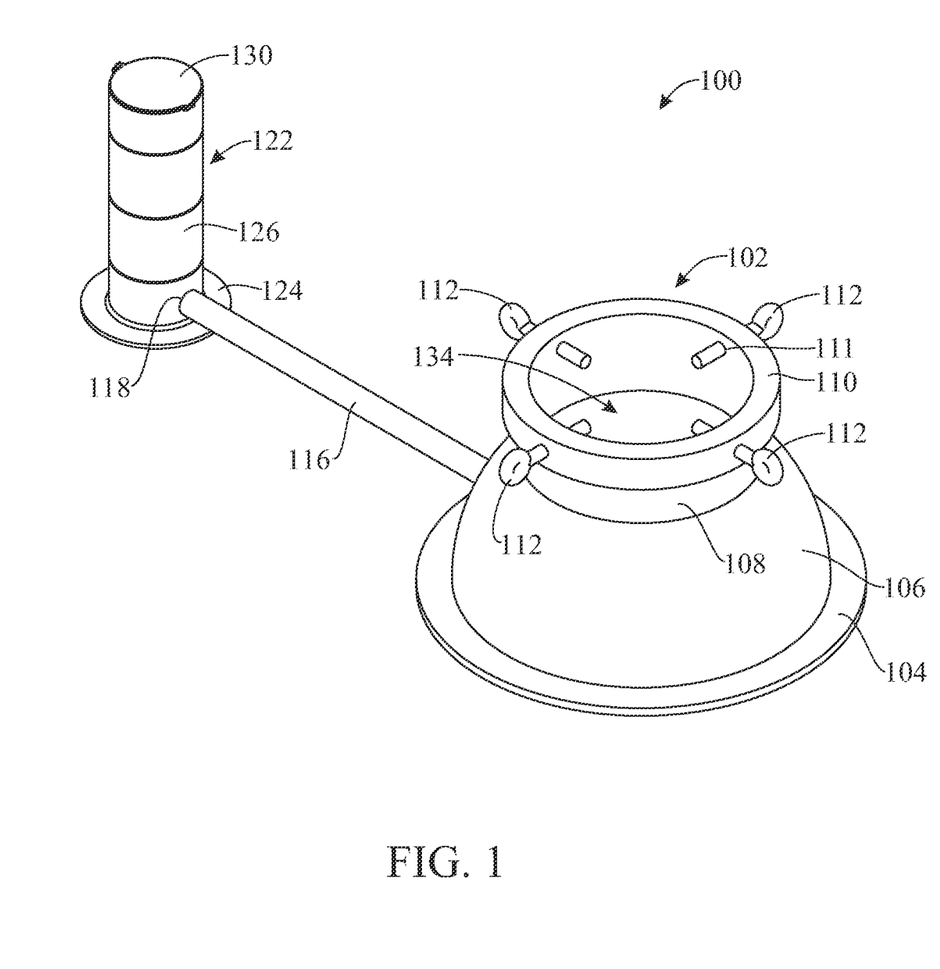
FIG. 1 presents a top front isometric view showing a watered tree stand system in accordance with an illustrative embodiment of the present invention.
Figure 2:
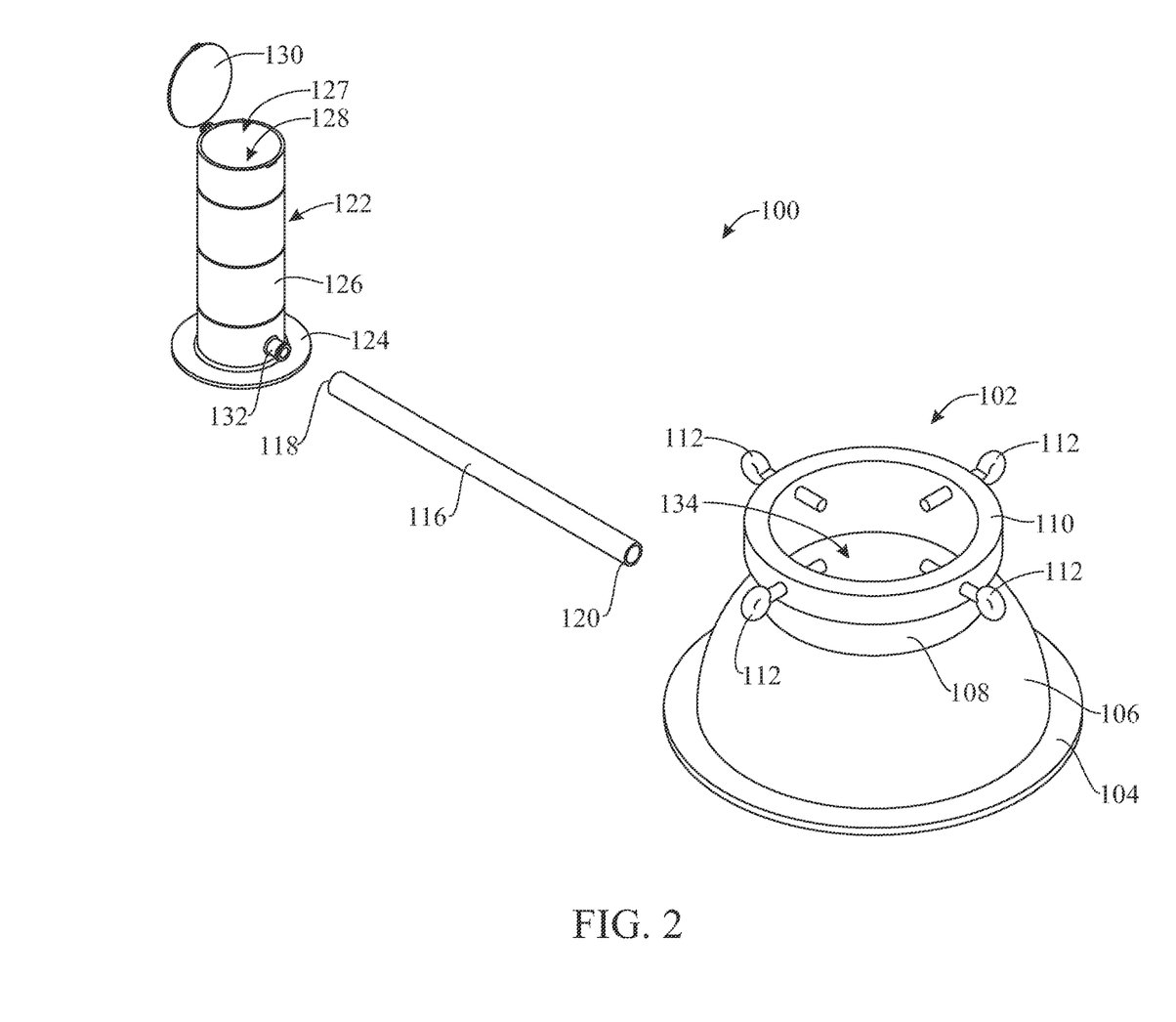
FIG. 2 presents an exploded top front isometric view of the watered tree stand system of FIG. 1.
Figure 3:
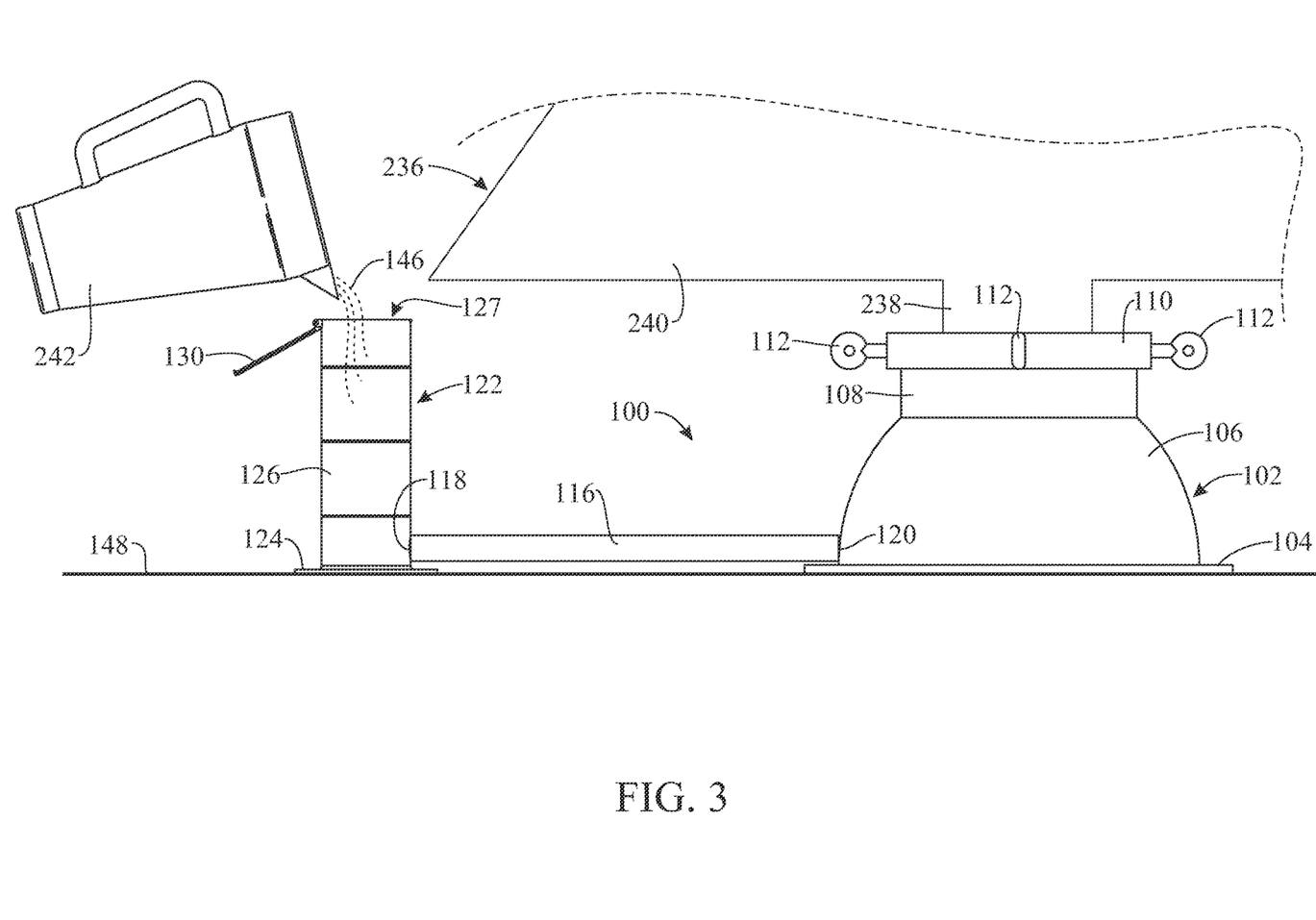
FIG. 3 presents a front elevation view showing the watered tree stand system of FIG. 1 with a tree installed in the base reservoir and a supply of water being poured into the water intake container to replenish the water in the base reservoir.
Figure 4:
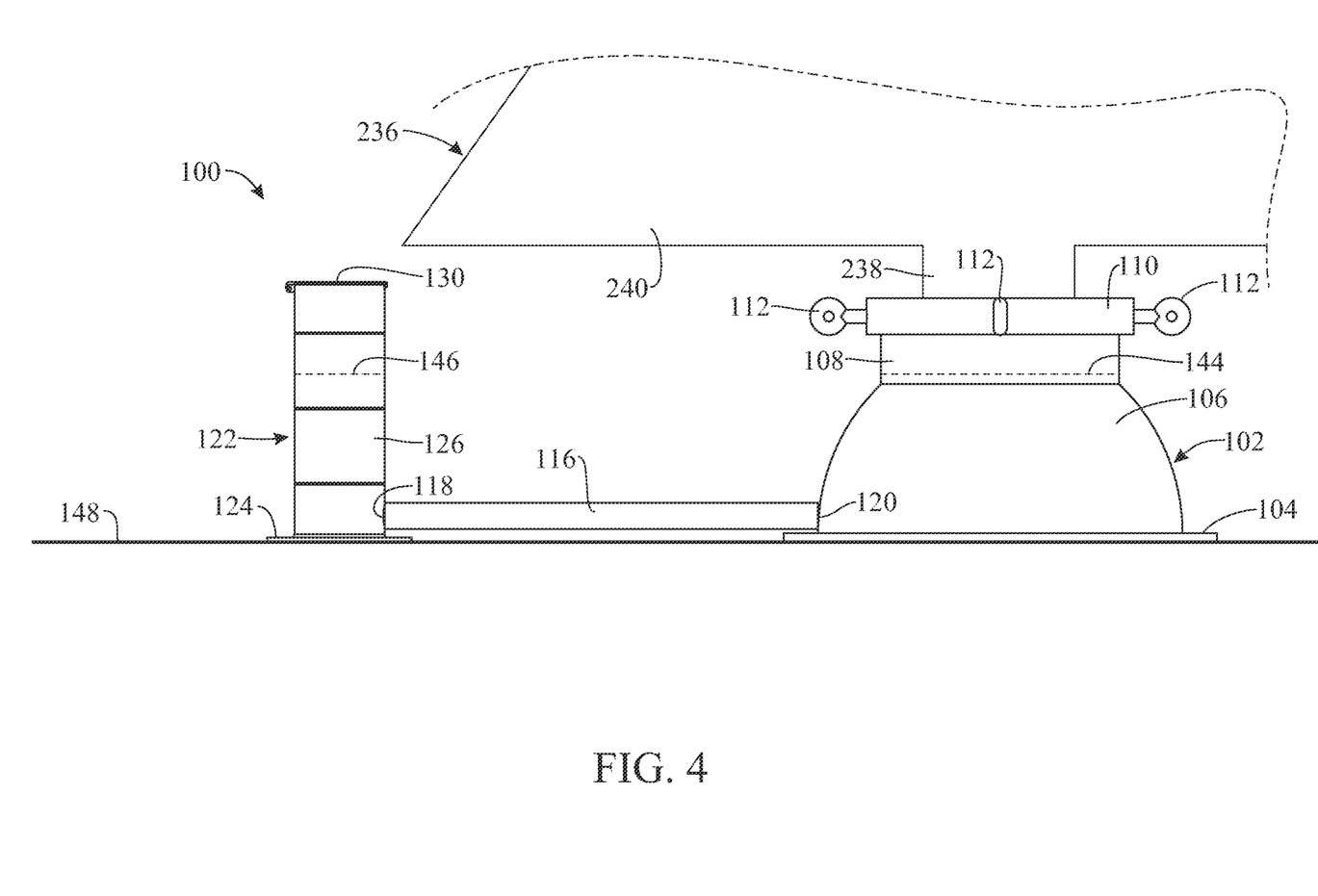
FIG. 4 presents a front elevation view of the watered tree stand system and tree of FIG. 3, showing the level of water in the base reservoir and the level of refill water in the water intake container in hidden lines.
Figure 5:
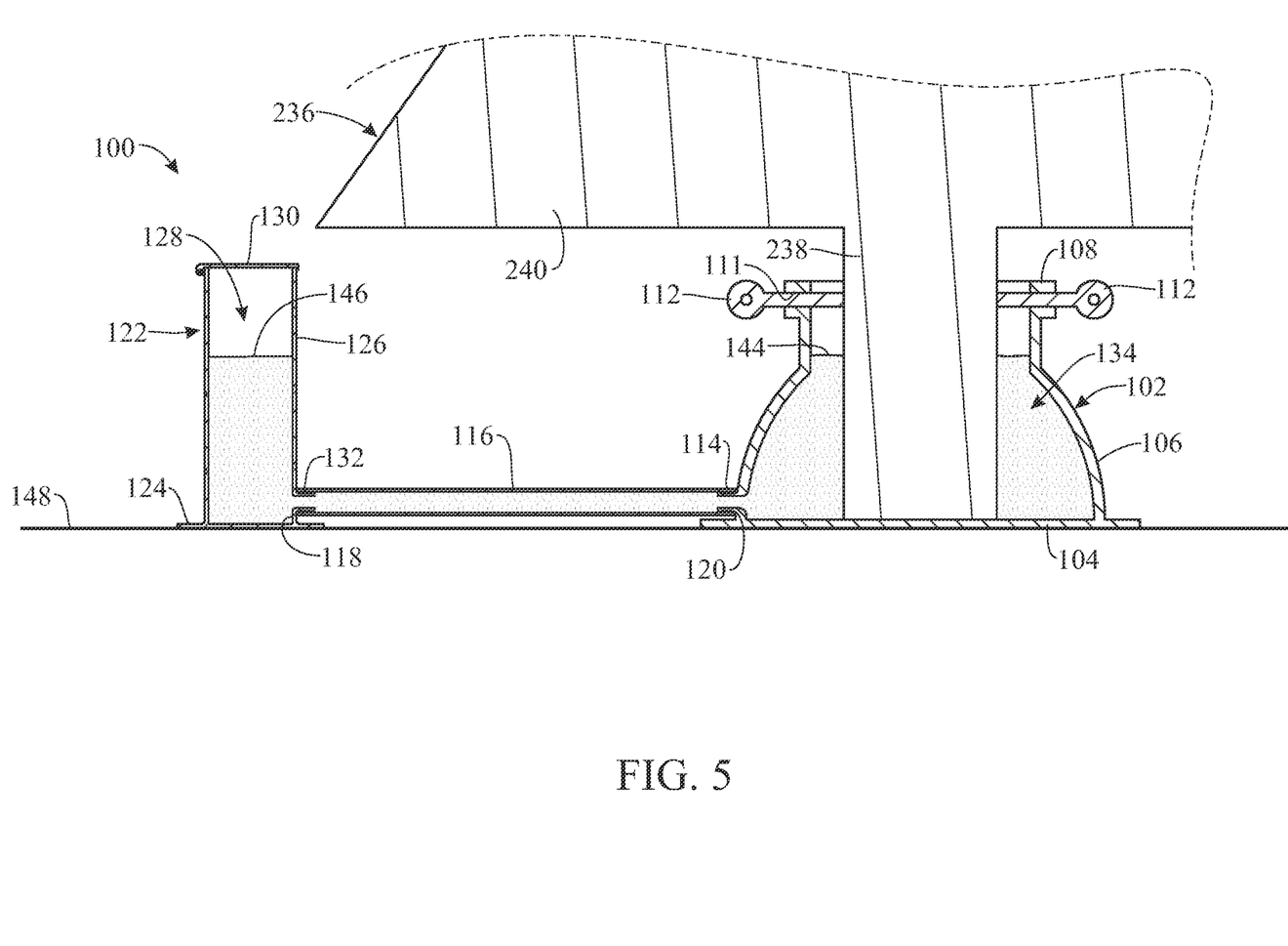
FIG. 5 presents a cross-sectional front elevation view of the watered tree stand system and tree of FIG. 3.

The illustrations of FIGS. 1-5 show a watered tree stand system 100 in accordance with a first embodiment of the invention. Referring initially to FIGS. 1 and 2, the watered tree stand system 100 may include a hollow, base reservoir 102. The base reservoir 102 is provided with an interior space or reservoir interior 134 which is suitably configured to contain a supply of water 144 (FIGS. 4 and 5). In some embodiments, the base reservoir 102 may include a base reservoir bottom wall or bottom 104. The base reservoir bottom 104 may facilitate deployment of the base reservoir 102 in an upward-standing position on a floor or supporting surface 148 (FIG. 3). A base reservoir sidewall 106 may extend from the base reservoir bottom 104. The base reservoir sidewall 106 and base reservoir bottom 104 form a receptacle and delimit the reservoir interior 134. In the present embodiment, the base reservoir sidewall 106 is generally dome-shaped and the base reservoir bottom 104 is generally planar and round, or disc-shaped; however, alternative shapes are contemplated without departing from the scope of the present disclosure. As shown in the drawings, the base reservoir bottom 104 may protrude radially outward from the base reservoir sidewall 106 to increase the overall stability of the base reservoir 102 when standing on the floor or supporting surface 148.

With continued reference to FIG. 1, multiple tree securing fasteners 112 may threadably engage the base reservoir 102 to press against a tree trunk 238 (FIG. 4) of a tree 236 and maintain the tree 236 in an upright position. It must be noted that, throughout the present document, the term 'trunk' is considered to encompass the roots of the tree, if present. In some embodiments, such as in the present embodiment, a base reservoir neck or rim 108 having a tree securing collar 110 is provided at a top area of the base reservoir sidewall 106, and the multiple tree securing fasteners 112 threadably engage respective fastener openings 111 which extend through the tree securing collar 110. Accordingly, as best shown in FIGS. 4 and 5, the tree securing collar 110 and base reservoir rim 108 may be suitably sized and configured to receive and accommodate the tree trunk 238 of the tree 236 in typical application of the watered tree stand system 100, which will be hereinafter described. The tree securing fasteners 112 may be threaded into and through the respective fastener openings 111, and extend radially inward into the reservoir interior 134 and towards the tree trunk 238 to engage the tree trunk 238 and secure the tree 236 in an upward-standing position. The tree securing fasteners 112 may be unthreaded in the respective fastener openings 111 to be at least partially extracted from the reservoir interior 134 and thus disengage the tree trunk 238 and facilitate placement of the tree trunk 238 into or removal of the tree trunk 238 from the base reservoir 102. In other embodiments of the invention, alternative techniques and methods known by those skilled in the art may be used to secure the tree trunk 238 in the base reservoir 102.

As further shown in FIGS. 1 and 2, a water intake container 122 may be disposed in spaced-apart relationship to the base reservoir 102. As illustrated in FIG. 2, the water intake container 122 may have a container interior 128 which is suitably configured to contain a supply of refill water 146 (FIG. 4). An elongated water delivery conduit 116 may establish fluid communication between the container interior 128 of the water intake container 122 and the reservoir interior 134 of the base reservoir 102. The water delivery conduit 116 of the present embodiment communicates a bottom of the container interior 128 with a bottom of the reservoir interior 134.

The water intake container 122 may include a container sidewall 126 which forms or defines the container interior 128. In some embodiments, the container sidewall 126 may be transparent or sufficiently see-through to allow an outside observer to distinguish the water level inside the water intake container 122. The container sidewall 126 may be elongated and cylindrical, as illustrated, for instance, without limitation. At least one opening 127 may be provided in the water intake container 122 in communication with the container interior 128; for instance, the water intake container 122 may include a single, top opening 127 at a top end of the container sidewall 126. A container base stabilizer or flange 124 may terminate and extend radially outward from a lower end of the container sidewall 126. The container base flange 124 may contribute to render the water intake container 122 self-standing on a floor or other supporting surface 148 in application of the watered tree stand system 100, as will be hereinafter described. In some embodiments, a container lid 130 may be provided on the container sidewall 126. The container lid 130 may be movably attached to the container sidewall 126 to allow a user to open and close the container lid 130 to allow or prevent access to the container interior 128; for instance and without limitation, the container lid 130 may be pivotally or detachably attached to the container sidewall 126.

As illustrated in FIG. 2, the water delivery conduit 116 may include an inlet end 118 which is disposed in fluid communication with the container interior 128 of the water intake container 122 and a discharge end 120 which is disposed in fluid communication with the reservoir interior 134 of the base reservoir 102, with the inlet end 118 and discharge end 120 being in fluid communication with one another via the water delivery conduit 116. The inlet end 118 and the discharge end 120 of the water delivery conduit 116 may be attached to the respective water intake container 122 and base reservoir 102 using a compression fitting, friction fitting, a threaded connection, a quick-release connection, or any other suitable technique providing a watertight connector between a water conduit and a container. For example, as illustrated in FIG. 5, in some embodiments, an inlet conduit nipple 132 may extend outwardly from the container sidewall 126 of the water intake container 122 in fluid communication with the container interior 128. In turn, a discharge conduit nipple 114 may extend outwardly from the base reservoir sidewall 106 of the base reservoir 102 in fluid communication with the reservoir interior 134. Accordingly, the inlet conduit nipple 132 of the water intake container 122 may be inserted into the inlet end 118 and the discharge conduit nipple 114 of the base reservoir 102 may be inserted into the discharge end 120 of the water delivery conduit 116, and frictionally remain attached thereto. In other embodiments, the water delivery conduit 116 may be fabricated in one piece with the water intake container 122 and the base reservoir 102 according to the knowledge of those skilled in the art.

Referring next to FIGS. 3-5, in typical application, the watered tree stand system 100 may be deployed on a floor or other supporting surface 148. Accordingly, the base reservoir bottom 104 of the base reservoir 102 may be placed on the surface 148. The water intake container 122 may be placed on the surface 148 in spaced-apart relationship to the base reservoir 102. The water delivery conduit 116 may be connected to and provide fluid communication between the water intake container 122 and the base reservoir 102.

A tree 236 may be deployed in an upright or standing position relative to the surface 148 by lowering and inserting the tree trunk 238 of the tree 236 through the tree securing collar 110 and the remainder of the base reservoir rim 108 into the reservoir interior 134 of the base reservoir 102. The tree securing fasteners 112 may be threaded radially inward in the base reservoir rim 108 (specifically, in the tree securing collar 110) and tightened against the tree trunk 238. Preferably, the length of the water delivery conduit 116 is determined or selected such that the water delivery conduit 116 is long enough for the water intake container 122 to be placed a sufficient distance away from the tree trunk 238 that the water intake container 122 is disposed beyond the main tree portion 240 of the tree 236 and can therefore be monitored and refilled without the main tree portion 240 interfering.

Once the watered tree stand system 100 is deployed, a user may easily and conveniently pour an initial supply of water 144 (FIG. 4) into the water intake container 122 through the top opening 127 of the water intake container 122. When pouring sufficient water into the water intake container 122, water flows through the water delivery conduit 116 to the base reservoir 102 and fill the container and reservoir interiors 128, 134 to a same height or water level, as shown in FIGS. 4 and 5, until water pressure within the water intake container 122 and base reservoir 102 is equalized.

Throughout time, the tree 236 will absorb the water 144 which is contained in the reservoir interior 134 of the base reservoir 102, and the water level in both the container and reservoir interior 128, 134 will equally descend. The user may detect water level being low in the reservoir interior 134 by seeing through the see-through container sidewall 126 of the water intake container 122 and detecting a low water level within the container interior 128 of the water intake container 122, as the water level within the container interior 128 is the same as the water level inside the base reservoir 102. Accordingly, as illustrated in FIG. 3, a supply of refill water 146 may be poured into the container interior 128 of the water intake container 122. By pressure difference, the refill water 146 will flow from the container interior 128 of the water intake container 122, through the water delivery conduit 116 and into the reservoir interior 134 of the base reservoir 102 until the water level in the container and reservoir interiors 128, 134 is again equalized. At all times, the user may check the water level in the base reservoir 102 by simply checking the water level in the water intake container 122, as both water levels are the same. Thus, by monitoring the water level inside the water intake container 122 while refilling the water intake container 122, overflow of the base reservoir 102 is prevented. The watered tree stand system 100, therefore, not only allows to easily and conveniently maintain a natural tree in an optimally hydrated condition, but also prevent water spills from the base reservoir 102 which supports the tree.

Figure 7:
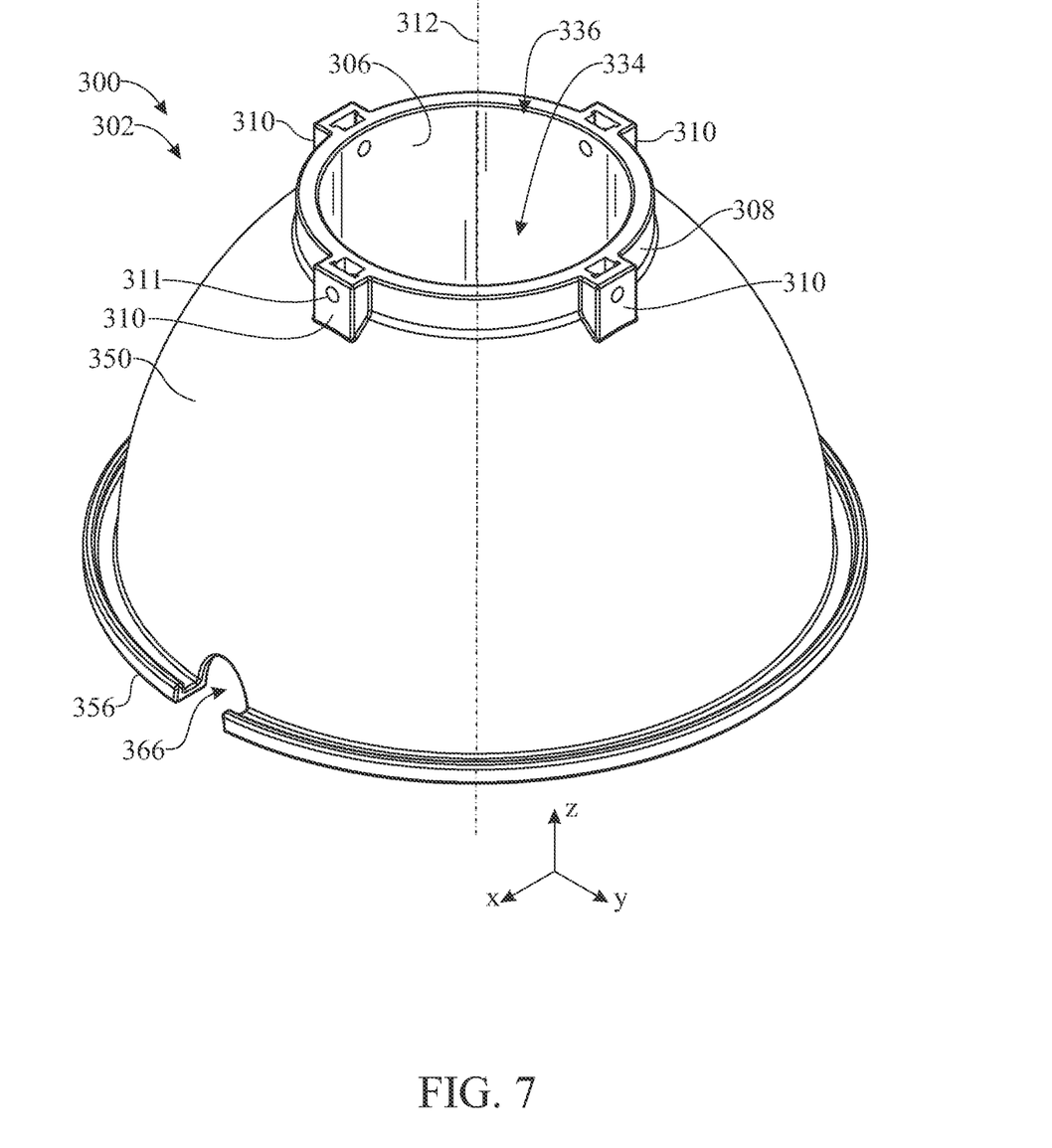
FIG. 7 presents a top front isometric view of a base reservoir of a watered tree stand system in accordance with a second illustrative embodiment of the present invention.
Figure 8:
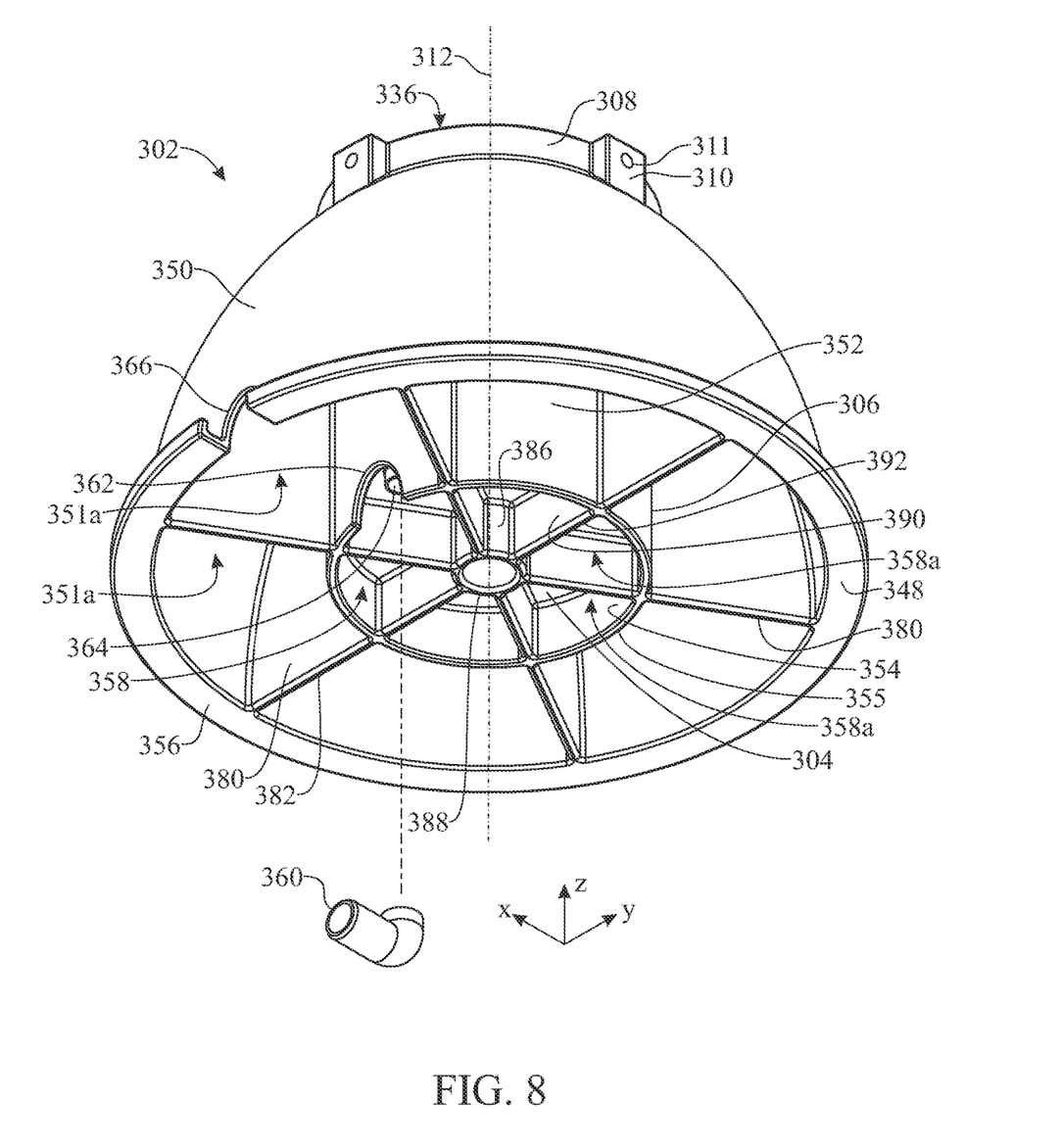
FIG. 8 presents an exploded, bottom front isometric view of the base reservoir of FIG. 7.
Figure 9:
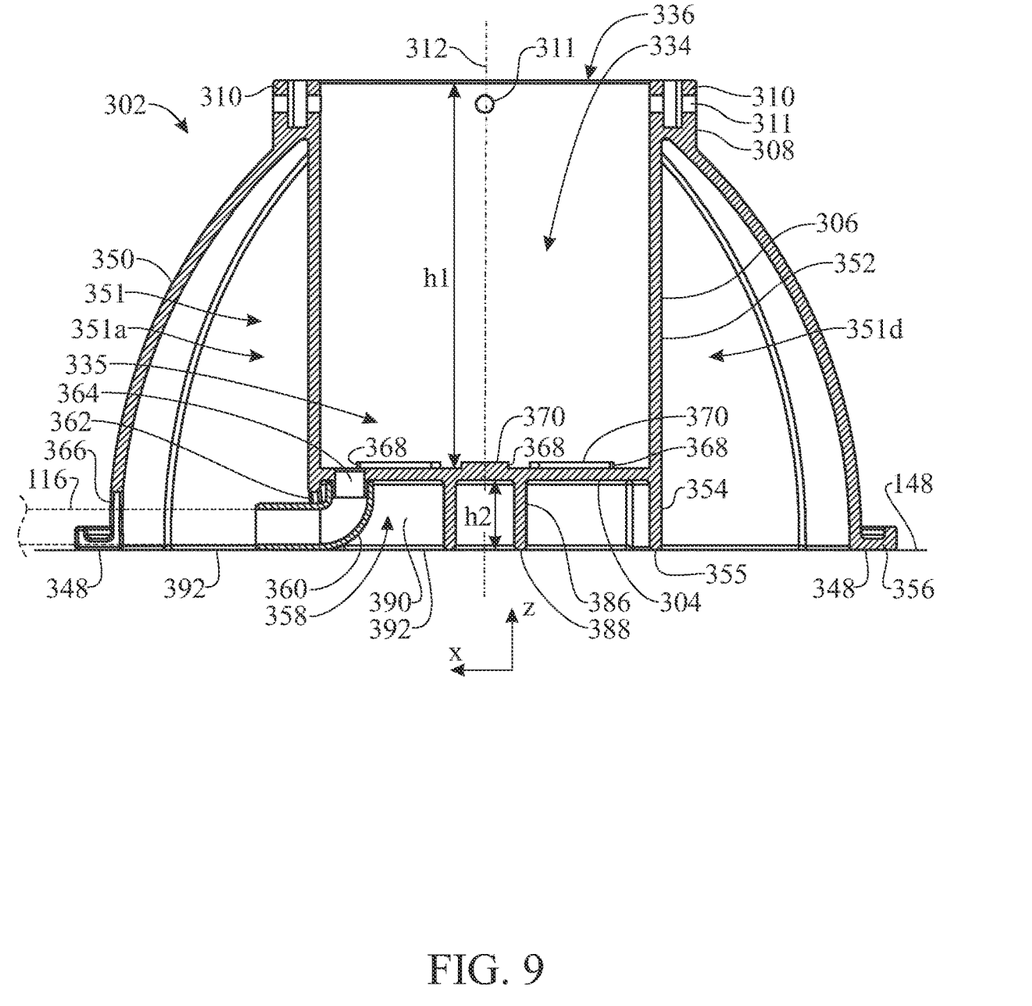
FIG. 9 presents a cross-sectional front elevation view of the base reservoir of FIG. 7.

The illustrations of FIGS. 7-9 show a base reservoir 302 comprised in a watered tree stand system in accordance 300 with a second illustrative implementation of the invention. Similarly to the previous implementation, the base reservoir 302 of the present implementation comprises a base reservoir interior 334 configured to contain water, the base reservoir interior 334 formed or defined by a base reservoir sidewall 306 and a base reservoir bottom 304. The base reservoir interior 334 terminates in a top opening 336 located at a top end of the base reservoir 302. As was described heretofore with reference to the previous embodiment, a tree trunk (e.g., tree trunk 238) may be inserted through the top opening 336 and into the base reservoir interior 334. The base reservoir interior 334 is configured to receive the tree trunk, and support the tree (e.g., tree 236) in an upright position. In some embodiments, such as the present embodiment, as shown, the base reservoir sidewall 306 is generally cylindrical; however, alternative shapes are contemplated without departing from the scope of the present disclosure. The top opening 336 may span the entire width or diameter of the base reservoir interior 334, as best shown in FIGS. 7 and 9, facilitating insertion and removal of the tree trunk into and from the base reservoir interior 334.

Also similarly to the previous embodiment, a base reservoir rim or neck 308 may be provided at a top end of the base reservoir 302, with one or more fastener openings 311 formed through the base reservoir neck 308. One or more fasteners (not shown, but otherwise similar or identical to fasteners 112) may respectively extend through the one or more fastener openings 311 of the base reservoir neck 308 and adjustably press against the trunk of the tree. In the present embodiment, the base reservoir neck 308 is formed at a top end of the base reservoir sidewall 306 and extends radially outward of the base reservoir sidewall 306, as best shown in FIG. 9. In some embodiments, the base reservoir neck 308 may extend radially outward of the base reservoir sidewall 306 at discrete sections therealong; for instance, in the present embodiment, the base reservoir neck 308 comprises a plurality of (e.g., four) radial ribs or protrusions 310, which may be arranged angularly equidistant with one another, for instance and without limitation, and which include the aforementioned fastener openings 311. The discrete, radial protrusions 310 provide the base reservoir neck 308 with a cross-section (FIG. 9) at said discrete points which is thicker than the base reservoir sidewall 306, allowing to increase the length of the fastener openings 311 and therefore the stability of the respective fastener (e.g., fastener 112) inserted through each fastener opening 311 and abutted against a tree trunk 328. In other embodiments, the base reservoir neck 308 may extend radially outward of the base reservoir sidewall 306 along the entire perimeter of the base reservoir sidewall 306 and provide an increased cross-section along said entire perimeter of the base reservoir sidewall 306.

Similarly to the previous embodiment, the base reservoir 302 can be disposed in fluid communication with a water intake container (e.g., water intake container 122 of FIGS. 1-5) which may be positioned in spaced-apart relationship with the base reservoir 302. A water delivery conduit 116, an example of which is shown schematically in FIG. 9, may be extended from the base reservoir 302 to the water intake container, wherein the water delivery conduit 116 establishes fluid communication between the water intake container interior (e.g., container interior 128 of FIGS. 2 and 5) and the base reservoir interior 334, similarly to the watered free stand system 100 of FIGS. 1-5. Also similarly to the previous embodiment, the base reservoir 302 of the present embodiment is such that water is fed into a bottom area 335 (FIG. 9) of the base reservoir interior 334.

The base reservoir 302 of the present embodiment further comprises an outer skirt 350 arranged around, and in spaced-apart relationship with, the base reservoir sidewall 306. The outer skirt 350 preferably surrounds the base reservoir sidewall 306 entirely, i.e. along an entire perimeter of the base reservoir sidewall 306. In some embodiments, the outer skirt 350 may extend from the top of the base reservoir sidewall 306 to the bottom of the base reservoir sidewall 306, and may conceal the base reservoir sidewall 306 and the base reservoir bottom 304, as shown in the drawings. For instance and without limitation, the outer skirt 350 may extend downward from the base reservoir neck 308, as shown for instance in FIG. 7. The radial protrusions 310 of the base reservoir neck 308 may extend upward from the outer skirt 350, as shown. As best shown in FIGS. 8 and 9, a gap 351 may be defined between the outer skirt 350 and the base reservoir sidewall 306.

The outer skirt 350 may have any applicable shape such as, but not limited to, a dome shape, an example of which is shown in the drawings. In some embodiments, the outer skirt 350 may be configured to stably rest, or stand, on a flat floor or surface 148. For example, the outer skirt 350 may include a bottom edge, surface or side, hereinafter referred to generally as bottom side 348, which may be formed along a same plane such that the bottom side 348 may stably rest against the flat surface 148. In some embodiments, the base reservoir skirt 350 may include a bottom flange 356 configured to stably rest on the flat surface 148 and stabilize the base reservoir 302, with an underside of the bottom flange 356 providing the bottom side 348 of the outer skirt 350. In preferred embodiments, as shown, the bottom flange 356 may extend radially outward of the outer skirt 350, further contributing to stability. In other embodiments, instead of being flat or planar, the bottom side 348 may include specific points (e.g., feet, legs, protrusions, etc.), the bottom sides of which may be coplanar to one another such that the bottom side 348 can stably rest against the flat surface 148.

In some embodiments, such as the present embodiment, the outer skirt 350 may extend downward past or beyond the base reservoir bottom 304, as shown in FIGS. 8 and 9; i.e., the base reservoir bottom 304 may be elevated from the ground and may also be elevated with respect to the bottom side 348 of the outer skirt 350. As best seen in FIG. 9, the base reservoir sidewall 306 of the present embodiment comprises an upper portion 352 extending above the base reservoir bottom 304 and delimiting the base reservoir interior 334, and a lower portion extending below the base reservoir bottom 304. The base reservoir bottom 304 is therefore arranged in an elevated relationship with the lower portion 352 of the base reservoir sidewall 306, and a gap or space 358 is formed or defined between the base reservoir bottom 304 and the lower portion of the base reservoir sidewall 306.

In some embodiments, as shown, the lower portion 352 of the base reservoir sidewall 306 can be configured to stably rest on the floor or other flat surface 148. For instance, the lower portion 352 may include a bottom edge, surface or side, hereinafter referred to generally as bottom side 355, which may be formed along a same plane such that the bottom side 355 may stably rest against the flat surface 148. Though not shown, in certain embodiments, the lower portion 352 may include a bottom flange configured to stably rest on the flat surface 148 and further stabilize the base reservoir 302.

The upper portion 352 and lower portion 354 of the base reservoir 302 may have a same shape and/or size. For instance, in the present embodiment, the upper and lower portions 352 and 354 have a same shape (cylindrical) and a same size (diameter). The upper portion 352 may be significantly taller than the lower portion 354, thereby maximizing the water storage capacity of the base reservoir interior 334. For example, as is the case of the present embodiment and with reference to FIG. 9, the height h1 of the upper portion 352 (i.e. of the base reservoir interior 334) may be at least five times the height h2 of the lower portion 354.

With continued reference to FIG. 9, the water delivery conduit 116 may extend through the outer skirt 350, through the lower portion 354 of the base reservoir sidewall 306, and to the base reservoir bottom 304, and fluid communication may be provided between outside the base reservoir 302 and the base reservoir interior 334 through the base reservoir bottom 304. In some embodiments, such as the present embodiment, the base reservoir 302 may include an opening 366 formed in the outer skirt 350. In preferred embodiments, the opening 366 is provided at the bottom of the outer skirt 350 and extends upward from the bottom side 348 of the outer skirt 350. Furthermore, the opening 366 may face the floor or other flat surface 148 when the bottom side 348 is resting on the flat surface 148. The opening 366 communicates the outside of the outer skirt 350, and thus the outside of the base reservoir 302, with the gap 351 formed between the outer skirt 350 and the base reservoir sidewall 306. Similarly, as shown, the lower portion 354 of the base reservoir sidewall 306 may include an opening 362, which may extend upward from the bottom side 355 of the lower portion 354, similarly to the opening 366, and may face the floor or flat surface 148, also similarly to the opening 366. The water delivery conduit 116 may extend through the openings 366 and 362 in the outer skirt 350 and the lower portion 354 of the base reservoir sidewall 306, respectively. In preferred embodiments, the openings 362 and 366 face one another, as shown, which allows the water delivery conduit 116 to extend therebetween in rectilinear fashion.

As further shown in FIG. 9, the base reservoir bottom 304 may include an inlet 364 providing fluid communication between the water delivery conduit 116 and the base reservoir interior 334. The inlet 364 may extend between the base reservoir interior 334 and the space 358 defined between the base reservoir bottom 304 and the lower portion 354 of the base reservoir sidewall 306, and the water delivery conduit 116 may extend into said space 358 and connect to the inlet 364. In preferred embodiments, such as the present embodiment, the inlet 364 may be offset a center of the base reservoir bottom 304, and preferably located closer to an outer edge of the base reservoir bottom 304 than to a center of the base reservoir bottom 304, and even more preferably adjacent to the base reservoir sidewall 306, thereby minimizing interference of the tree trunk and the inlet 364 and allowing to maximize the thickness of the tree trunk which may be received within the base reservoir interior 334.

In some embodiments, the base reservoir bottom wall or bottom 304 may include one or more upwardly-directed protrusions 368, a top side 370 of which provides a support for the tree trunk which is elevated with respect to the inlet 364, facilitating water flow through the inlet 364 and into the base reservoir interior 334. The one or more protrusions 370 may include a plurality of protrusions, as shown, which are arranged in a spaced-apart relationship with each other and thus contribute to a more uniform distribution of water underneath the tree trunk which may be resting on the top side 370 of the plurality of protrusions 368. In some embodiments, such as the present embodiment, the top sides 370 of the plurality of protrusions 368 may be coplanar and preferably horizontal. However, alternative embodiments are contemplated in this regard; for example, the top sides 370 may be sloped or otherwise oriented to direct the tree trunk (which rests on the top sides 370) towards the center of the base reservoir bottom 304 and/or away from the inlet 364.

In some embodiments, such as the present embodiment, the base reservoir 302 may comprise an elbow-shaped, water inlet nipple or connector 360. The water inlet connector 360 may extend through the opening 362 in the lower portion 354 of the base reservoir sidewall 306 and may be connected to the inlet 364. The elbow-shaped, water inlet connector 360 may facilitate the attachment of a water tubing comprised in the water delivery conduit 116. In some embodiments, the elbow-shaped, water inlet connector 360 may provide an optionally curved (as shown), 90-degree elbow allowing incoming water to flow from a lateral direction (from the opening 366 to the opening 362) and then flow in a substantially vertical direction through the inlet 364.

With reference to FIG. 8, in some embodiments, the base reservoir 302 may further include one or more, and preferably a plurality of first reinforcement ribs 380 arranged within the gap 351 and extending from the outer skirt 350 and/or the base reservoir sidewall 306, and more preferably, from the outer skirt 350 to the base reservoir sidewall 306. For instance, the present embodiment includes six first reinforcement ribs 380 extending from the outer skirt 350 to the base reservoir sidewall 306 and dividing up the gap 351 into six gap sections 351a. In some embodiments, the first reinforcement ribs 380 may be arranged in a radial or star-like configuration, as shown, relative to a central longitudinal axis 312 (i.e. a central axis arranged along a longitudinal or vertical direction z) of the base reservoir 302, and may be arranged angularly equidistant, thereby increasing symmetry and sideways or lateral stability along virtually any direction on an x-y plane, i.e. on a plane perpendicular to the vertical direction z.

Alternatively or additionally, the base reservoir 302 may include one or more, and preferably a plurality of second reinforcement ribs 390 arranged within the gap or space 358 formed between the lower portion 354 of the base reservoir sidewall 306 and the base reservoir bottom 304. Preferably, the one or more, second reinforcement ribs 390 extend inward, and more preferably, radially inward, from the lower portion 354 of the base reservoir sidewall 306. For instance, the present embodiment includes six second reinforcement ribs 390, which divide up the gap or space 358 into six gap sections 358a. In some embodiments, the second reinforcement ribs 390 may be arranged in a radial or star-like configuration, as shown, relative to the central longitudinal axis 312 of the base reservoir 302, and may be arranged angularly equidistant, thereby increasing symmetry and sideways or lateral stability along virtually any direction on the x-y plane.

In some embodiments, the base reservoir 302 may further include a central column 386 arranged in the space 358 and extending downward from the base reservoir bottom 304. The central column 386 may be configured to stably rest against the flat floor or surface 148. For instance and without limitation, a bottom surface, edge or side (hereinafter referred to as bottom side 388) of the central column 386 may be formed on a same plane and configured to stably rest on the flat surface 148. The one or more, second reinforcement ribs 390 may extend from the central column 386.

In preferred embodiments of the invention, as shown, the bottom sides 356, 355 and 388 which are configured to stably rest on the flat surface 148 are concentric. For instance, in the present embodiment, all bottom sides 356, 355 and 388 are configured to stably rest on the flat surface 148, are coplanar to each other, and are concentrically disposed about the central longitudinal axis 312 of the base reservoir 302. Furthermore, in preferred embodiments, some, and preferably all of the bottom sides 356, 355 and 388 which are configured to stably rest on the ground 148 are circular, as shown. Having the coplanar, supporting bottom sides 356, 355 and 388 circular and concentric maximizes and equalizes lateral stability of the base reservoir 302 and tree along any lateral or transverse direction on the x-y plane. In certain embodiments, such as the present embodiment, stability is further symmetrically increased by having bottom sides 392 of the second reinforcement ribs 390 and bottom sides 382 of the first reinforcement ribs 380 also configured to stably rest on the flat surface 148, i.e. coplanar with any other aforementioned bottom sides which are also configured to stably rest on the flat surface 148.

In summary, the watered tree stand system disclosed herein allows to provide a more continuous supply of water to a tree throughout display of the tree, minimizing the risk of a person not realizing the base reservoir has run out of water, maximizing ease of use and minimizing the risk of water spills. The tree may therefore remain in a fresh and attractive live state throughout display with little effort from the user. Having the water intake container preferably located beyond the main tree portion of the tree facilitates ease of access to a user in pouring the refill water typically from a water container into the container interior of the water intake container. Having the container sidewall of the water intake container see-through enables the user of the watered tree stand system to visually verify the level of refill water in the water intake container and base reservoir, and maintain a constant supply of the refill water in the water intake container.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A tree stand system for supporting a tree and providing water to the tree comprises:
   a base reservoir configured to stably rest on a flat surface and support a tree in an upright position relative to the surface, the base reservoir comprising:
   a base reservoir interior configured to contain water and receive a trunk of said tree,
   a base reservoir bottom, arranged in an elevated position relative to the surface, a space being provided between the base reservoir bottom and the surface when the base reservoir is resting on said surface,
   a base reservoir sidewall extending from the base reservoir bottom, the base reservoir sidewall and the base reservoir bottom defining the base reservoir interior,
   an inlet formed through the base reservoir bottom and arranged facing said space,
   an outer skirt arranged around and in spaced-apart relationship with the base reservoir sidewall and concealing the base reservoir sidewall and base reservoir bottom, and
   one or more reinforcement ribs extending from the outer skirt and to the base reservoir sidewall;
   a water intake container disposed in spaced-apart relationship with the base reservoir, the water intake container having a water intake container interior configured to contain water; and
   a water delivery conduit configured to establish fluid communication between the water intake container interior and the base reservoir interior through the inlet of the base reservoir bottom.

2. The tree stand system of claim 1, wherein the inlet is offset a center of the base reservoir bottom.

3. The tree stand system of claim 2, wherein the base reservoir sidewall extends from an outer edge of the base reservoir bottom, and further wherein the inlet is closer to the outer edge of the base reservoir bottom than to the center of the base reservoir bottom.

4. The tree stand system of claim 3, wherein the inlet is adjacent to the outer edge of the base bottom.

5. The tree stand system of claim 1, wherein a bottom side of the outer skirt is configured to stably rest on the surface.

6. The tree stand system of claim 1, wherein the one or more reinforcement ribs comprise a plurality of reinforcement ribs arranged radially and angularly equidistant relative to a central longitudinal axis of the base reservoir.

7. The tree stand system of claim 1, wherein each reinforcement rib of the one or more reinforcement ribs comprises a respective bottom side configured to stably rest on the surface.

8. The tree stand system of claim 1, wherein the base reservoir bottom is arranged in an elevated relationship relative to a lower portion of the base reservoir sidewall, and further wherein the water delivery conduit extends through a first opening formed in the outer skirt and through a second opening formed in the lower portion of the base reservoir sidewall.

9. The tree stand system of claim 8, wherein the first opening extends from a bottom side of the outer skirt, and further wherein the bottom side of the outer skirt is configured to stably rest on the surface.

10. The tree stand system of claim 8, wherein a bottom side of the base reservoir sidewall is configured to stably rest on the surface, and further wherein the bottom sides of the outer skirt and base reservoir sidewall are concentric.

11. The tree stand system of claim 8, wherein the second opening extends from a bottom side of the base reservoir sidewall, and further wherein the bottom side of the base reservoir sidewall is configured to stably rest on the surface.

12. The tree stand system of claim 8, wherein the first and second openings are arranged facing one another.

13. The tree stand system of claim 8, wherein the base reservoir comprises an elbow-shaped, water inlet connector connected to the inlet of the base reservoir bottom and extending through the lower portion of the base reservoir sidewall.

14. The tree stand system of claim 8, further comprising one or more reinforcement ribs extending from the lower portion of the base reservoir sidewall to a central column, the central column extending downward of the base reservoir bottom and having a bottom side configured to stably rest on the surface.

15. The tree stand system of claim 14, wherein the one or more reinforcement ribs extending from the lower portion of the base reservoir sidewall to the central column comprise a plurality of reinforcement ribs arranged in radial and angularly equidistant configuration relative to a central longitudinal axis of the base reservoir.

16. The tree stand system of claim 1, wherein the base reservoir comprises one or more top portions extending from the base reservoir sidewall and provided with a greater width than the base reservoir sidewall, each top portion of the one or more top portions comprising a fastener opening for receiving a respective fastener configured to engage the trunk of the tree to support the tree in the upright position.

17. A tree stand system for supporting a tree and providing water to the tree comprises:
   a base reservoir configured to stably rest on a flat surface and support a tree in an upright position relative to the surface, the base reservoir comprising:
      a base reservoir interior configured to contain water and receive a trunk of said tree,
      a base reservoir bottom, arranged in an elevated position relative to the surface, a space being provided between the base reservoir bottom and the surface when the base reservoir is resting on said surface,
      a base reservoir sidewall extending from the base reservoir bottom, the base reservoir sidewall and the base reservoir bottom defining the base reservoir interior, the base reservoir sidewall comprising a lower portion extending below the base reservoir bottom, the lower portion comprising a bottom side configured to stably rest on the surface,
      an inlet formed through the base reservoir bottom and arranged facing said space, and
      an outer skirt arranged around and in spaced-apart relationship with the base reservoir sidewall and concealing the base reservoir sidewall and base reservoir bottom, wherein a bottom side of the outer skirt is configured to stably rest on the surface;
   a water intake container disposed in spaced-apart relationship with the base reservoir, the water intake container having a water intake container interior configured to contain water, and
   a water delivery conduit establishing fluid communication between the water intake container interior and the base reservoir interior through the inlet of the base reservoir bottom, the water delivery conduit extending through a first opening formed in the outer skirt and through a second opening formed in the lower portion of the base reservoir sidewall.

18. The tree stand system of claim 17, wherein the first opening extends from a bottom side of the outer skirt, and further wherein the bottom side of the outer skirt is configured to stably rest on the surface.

19. The tree stand system of claim 17, wherein a bottom side of the base reservoir sidewall is configured to stably rest on the surface, and further wherein the bottom sides of the outer skirt and base reservoir sidewall are concentric.

20. The tree stand system of claim 17, wherein the second opening extends from a bottom side of the base reservoir sidewall, and further wherein the bottom side of the base reservoir sidewall is configured to stably rest on the surface.

21. The tree stand system of claim 17, wherein the first and second openings are arranged facing one another.

22. The tree stand system of claim 17, wherein the base reservoir comprises an elbow-shaped, water inlet connector connected to the inlet of the base reservoir bottom and extending through the lower portion of the base reservoir sidewall.

23. The tree stand system of claim 17, further comprising one or more reinforcement ribs extending from the lower portion of the base reservoir sidewall to a central column, the central column extending downward of the base reservoir bottom and having a bottom side configured to stably rest on the surface.

24. The tree stand system of claim 23, wherein the one or more reinforcement ribs comprise a plurality of reinforcement ribs arranged in radial and angularly equidistant configuration relative to a central longitudinal axis of the base reservoir.

* * * * *